United States Patent
Dymetman

(10) Patent No.: US 8,983,887 B2
(45) Date of Patent: Mar. 17, 2015

(54) PROBABILISTIC SAMPLING USING SEARCH TREES CONSTRAINED BY HEURISTIC BOUNDS

(75) Inventor: Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 936 days.

(21) Appl. No.: 13/083,670

(22) Filed: Apr. 11, 2011

(65) Prior Publication Data

US 2012/0259807 A1    Oct. 11, 2012

(51) Int. Cl.
*G06N 5/00* (2006.01)
*G06F 17/27* (2006.01)
*G06F 17/18* (2006.01)
*G06F 17/28* (2006.01)

(52) U.S. Cl.
CPC ............... *G06F 17/27* (2013.01); *G06N 5/003* (2013.01); *G06F 17/18* (2013.01); *G06F 17/2809* (2013.01)
USPC .......................................................... 706/45

(58) Field of Classification Search
CPC ................................................... G06N 5/003
USPC .......................................................... 706/45
See application file for complete search history.

(56) References Cited

U.S. PATENT DOCUMENTS

2012/0259807 A1    10/2012    Dymetman

OTHER PUBLICATIONS

Edward Schofield ("Fitting maximum-entropy models on large sample spaces" 2007).*
Benjamin Snyder ("Unsupervised Multilingual Learning" Sep. 2010).*
The Authoritative Dictionary of IEEE Standards Terms. Seventh Edition. only cover page and p. 297.*
Andrieu, et al. "A tutorial on adaptive MCMC", Stat Comput (2008), vol. 18, pp. 343-373.
Chiang, David. "Hierarchical Phrase-Based Translation", Association for Computational Linguistics, 2007, vol. 33, No. 2, pp. 201-228.
Hart et al. "A Formal Basis for the Heuristic Determination of Minimum Cost Paths", IEEE Transactions of Systems Science and Cybernetics, vol. SSC-4, No. 2, Jul. 1968, pp. 100-107.
"Chapter 4: Informed Search and Exploration", pp. 94-136.
"A Brief Introduction to Graphical Models and Bayesian Networks," Retrieved from Internet on Oct. 14, 2011; http://www.cs.berkeley.edu/~murphyk/Bayes/bayes.html, pp. 1-19.
Gilks, et al., "Adaptive Rejection Sampling for Gibbs Sampling," Appl. Statist., 41, No. 2, pp. 337-348 (1992).

(Continued)

*Primary Examiner* — Lut Wong
(74) *Attorney, Agent, or Firm* — Fay Sharpe LLP

(57) ABSTRACT

Markov Chain Monte Carlo (MCMC) sampling of elements of a domain to be sampled is performed to generate a set of samples. The MCMC sampling is performed over a search tree of decision sequences representing the domain to be sampled and having terminal nodes corresponding to elements of the domain. In some embodiments the MCMC sampling is performed by Metropolis-Hastings (MH) sampling. The MCMC sampling is constrained using a bound on nodes of the search tree. The constraint may entail detecting a node whose bound value ensures that an acceptable element cannot be identified by continuing traversal of the tree past that node, and terminating the traversal in response. The constraint may entail selecting a node to serve as a starting node for a sampling attempt in accordance with a statistical promise distribution indicating likelihood that following a decision sequence rooted at the node will identify an acceptable element.

22 Claims, 4 Drawing Sheets

(56) References Cited

OTHER PUBLICATIONS

Görür, et al., "Concave Convex Adaptive Rejection Sampling," Gatsby Computational Neuroscience Unit, pp. 1-16 (2008).
Jordan, et al., "An introduction to Variational Methods for Graphical Models," Machine Learning, 37, pp. 183-233 (1999).
Propp, et al., "Exact Sampling with Coupled Markov Chains and Applications to Statistical Mechanics," Department of Mathematics, Massachusetts Institute of Technology, pp. 1-27 (1996).
Wainwright, et al., "Tree-reweighted belief propogation algorithms and approximate ML estimation by pseudo-moment matching," In AISTATS, pp. 1-8 (2003).
Wetherell, "Probabilistic Languages: A Review and Some Open Questions," Computing Surveys, vol. 12, No. 4, pp. 1-19 (1980).
Yedidia, et al., "Generalized Belief Propagation," pp. 1-7 (2001).
Mansingha, et al., "Exact and Approximate Sampling by Systematic Stochastic Search," pp. 1-8 (2009).

* cited by examiner

PROBABILISTIC SAMPLING USING SEARCH TREES CONSTRAINED BY HEURISTIC BOUNDS

BACKGROUND

The following relates to the statistical sampling arts, Monte Carlo sampling arts, Markov Chain Monte Carlo sampling arts, computational design and analysis arts, and so forth, and to arts employing same such as machine translation, natural language processing, and so forth.

Statistical or Monte Carlo sampling employs random sampling of a domain to estimate a distribution, to obtain samples in (approximate) accordance with a distribution, to compute an integral, or to generate some other result of interest. In Markov Chain Monte Carlo (MCMC) approaches, a Markov chain of samples is constructed over a chain length sufficient to converge to an equilibrium result. For example, in a "random walk" MCMC approach, the chain is constructed by moving in a random direction from a currently accepted sample to a next sample. The result generated by a random walk MCMC approach can be adversely impacted by the choice of starting point for the random walk, which can lead to slow convergence or to convergence to a local extremum.

In Metropolis-Hasting (MH) MCMC approaches, the random walk is replaced by sampling in accordance with a normalized "proposal" distribution that is chosen such that the domain is readily sampled in accordance with the proposal distribution. In MH sampling, the Markov chain is constructed as follows: given a currently accepted sample, a new sample is chosen in accordance with the proposal distribution. If the new sample satisfies an acceptance criterion then it becomes the next accepted sample in the chain; otherwise, the currently accepted sample is repeated in the chain. In probabilistic sampling applications, the acceptance criterion is suitably embodied as a target distribution (not necessarily normalized) and the acceptance or rejection is performed on a statistical basis in accordance with the target distribution, for example by comparing the target distribution value at the node with a value drawn from a uniform probability. The MH approach eliminates dependence on the starting point of the sampling and, for a suitable choice of the proposal distribution, can ensure convergence to the globally optimal result in the limit. However, a poor choice for the proposal distribution can still lead to slow convergence, and there may be no suitable basis for choosing a "good" proposal distribution that ensures suitably fast convergence.

For example, consider MH sampling guided by an unnormalized target distribution that determines whether a sample is accepted or rejected. (Said another way, the acceptance criterion is statistical in nature and is defined by the unnormalized target distribution). Here, the convergence rate is typically controlled by the similarity (or dissimilarity) of the proposal distribution to the target distribution, as this determines how frequently samples generated by the proposal distribution are accepted by the target distribution. If the proposal distribution differs significantly from the target distribution then the MH sampling may become "trapped" for extended periods at a currently accepted sample, as the proposal distribution has difficulty proposing a new sample that is "acceptable" to the target distribution. In practice, however, it can be difficult to design a normalized proposal distribution that is sufficiently similar to the unnormalized target distribution to provide fast convergence.

In independent MH sampling, the proposal distribution is independent of the last accepted sample. In generalized MH sampling, the proposal distribution is conditioned on the last accepted sample. The generalized MH sampling is thus in a sense "closer" to the random walk MCMC approach, insofar as the next sample has some dependency on the last accepted sample. Accordingly, generalized MH sampling is also sometimes referred to as random walk MH sampling. The generalized MH sampling approach can improve convergence since the conditioning upon the last accepted sample tends to increase similarity between the conditional proposal distribution and the unnormalized target distribution. However, as with random walk MCMC, conditioning the proposal distribution on the last accepted sample can lead to undesirable dependence of the result on the starting point. Moreover, even with conditioning on the last accepted sample, the proposal distribution may still have substantial dissimilarity from the target distribution leading to slow convergence of the generalized MH sampling.

The following sets forth improved methods and apparatuses.

BRIEF DESCRIPTION

In some illustrative embodiments disclosed as illustrative examples herein, a method comprises: performing independent Metropolis-Hastings (MH) sampling of elements of a domain to be sampled to generate a set of samples, wherein the independent MH sampling is performed over a search tree of decision sequences representing the domain to be sampled and having terminal nodes corresponding to elements of the domain; and constraining the independent MH sampling using a bound on nodes of the search tree. The performing and the constraining are suitably performed by a digital processing device.

In some illustrative embodiments disclosed as illustrative examples herein, a storage medium stores instructions executable by a processing device to perform a method as set forth in the immediately preceding paragraph.

In some illustrative embodiments disclosed as illustrative examples herein, an apparatus comprises a digital processing device configured to perform a method comprising: performing Markov Chain Monte Carlo (MCMC) sampling of elements of a domain to be sampled to generate a set of samples, wherein the MCMC sampling is performed over a search tree of decision sequences representing the domain to be sampled and having terminal nodes corresponding to elements of the domain; and constraining the MCMC sampling using a bound on nodes of the search tree.

In some illustrative embodiments disclosed as illustrative examples herein, a storage medium stores instructions executable by a digital processing device to perform a method comprising: performing Markov Chain Monte Carlo (MCMC) sampling of elements of a domain to be sampled to generate a set of samples, wherein the MCMC sampling is performed over a search tree of decision sequences representing the domain and having terminal nodes corresponding to elements of the domain, wherein the MCMC sampling accepts or rejects elements based on a probabilistic acceptance criterion and a drawn probability, and wherein the MCMC sampling constrains the sampling based on values of a bound at nodes of the search tree.

DETAILED DESCRIPTION

Figure 1:
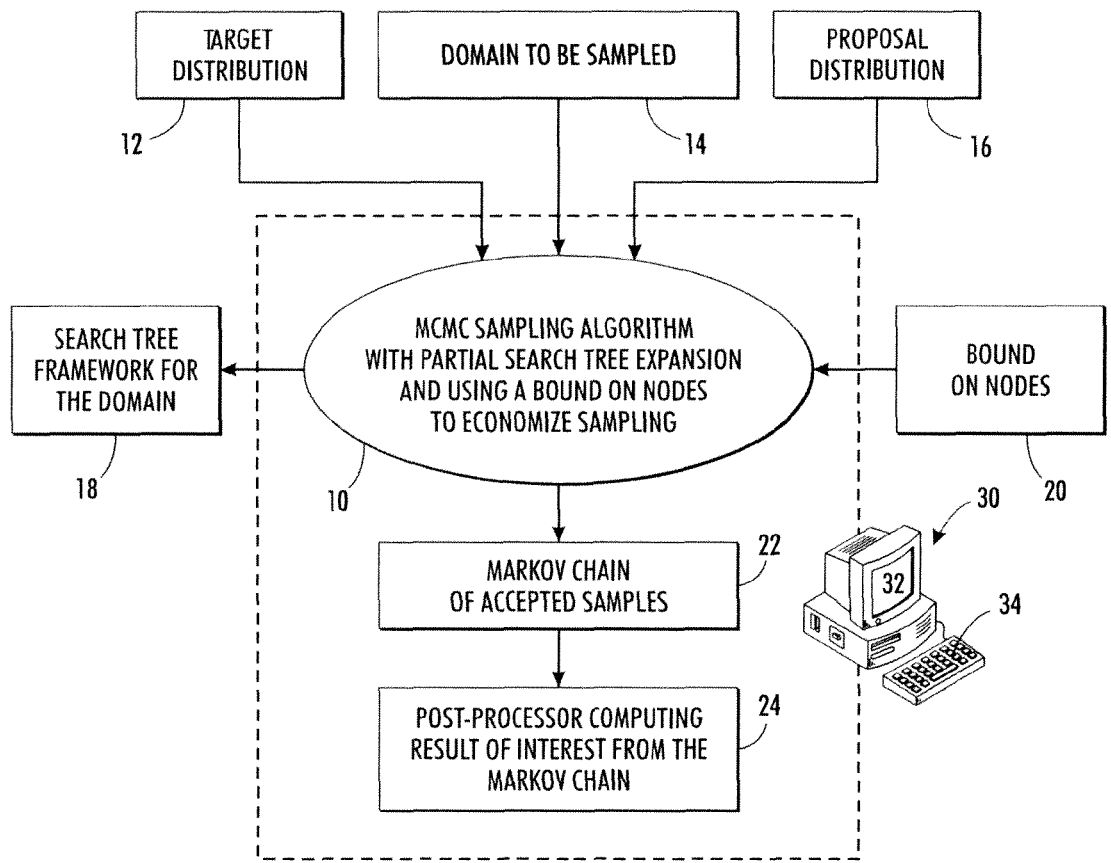
FIG. 1 diagrammatically shows an apparatus performing search tree-based Monte Carlo sampling constrained using a bound on nodes of the search tree.

Markov chain Monte Carlo (MCMC) sampling approaches disclosed herein are based on the insight that slow convergence is typically a consequence of a high fraction of samples not satisfying the target distribution (in a statistical sense) and hence being discarded. As a consequence, the Markov chain grows to include many repetitions of a currently accepted sample before moving on to a next sample that satisfies the target distribution. To achieve an equilibrium result, these long repetitions must be balanced by long repetitions of other accepted samples until the Markov chain approximates the equilibrium distribution. The MCMC sampling thus spends considerable time in "stagnant" intervals during which numerous samples are measured against the target distribution and rejected.

The MCMC sampling approaches disclosed herein relate to the special case in which the sampling can be performed in the context of a search tree of decision sequences. In this context, sampling entails following a decision sequence through the search tree until a terminal node is reached. In this search tree framework for domain sampling, the samples are located at terminal nodes of the (full) search tree. As an illustrative example, this approach can be used in natural language processing to perform parsing of a sentence using a probabilistic context-free grammar (PCFG). Given a sentence, the PCFG may provide a number of different possible parsings, each with some assigned probability. These parsings can be generated by sampling the sentence (i.e., the "domain" in this application) using the PCFG represented by a search tree. By way of illustrative example, one sampling instance may start with the word "drive". This word can be a noun (e.g., as in the sentence "It was a long drive.", or in the usage " . . . a drive to succeed . . . ", or in the technology usage " . . . a computer drive . . . ", or in the sports usage " . . . a touchdown drive . . . "). The word "drive" can alternatively be a verb (e.g., as in the sentence "I will drive grandmother to the store.", or the usage " . . . to drive the point home . . . "). At a first node, the search tree determines some probative aspect of the context of the word "drive" in the sentence, such as the immediately preceding word (or its part-of-speech, if known). Different possible "answers" to this probative "question" correspond to different tree branches extending from the node. Depending upon the correct answer for the specific sentence being parsed, further questions may be asked. At some point, the word "drive" is assigned a part of speech (with some associated statistical probability) and that information may be used in analyzing other words (for example, if "drive" is assigned the "noun" part of speech then some surrounding words may be assigned to belong to an associated "noun phrase"). By processing from node to node through the search tree, the processing eventually reaches a terminal node (that is, a node having no further branches extending away from it)—the terminal node represents the parsing sample, and has some associated probability. This process is repeated a number of times to generate a set of parsing samples with associated probabilities, and the most likely parsing(s) is (are) selected for presentation to the user or for other use.

The search tree framework for sampling a natural language domain using a PCFG is augmented by additional constraints on the traversal of the search tree, such as a requirement for subject/verb agreement. Such additional constraints can be made more or less stringent by suitable multiplicative weighting applied within the PCFG search tree framework. In similar fashion, an n-gram language model can be integrated into the search tree framework by formulating the n-gram language model as a multiplicative factor applied over the base PCFG probabilities.

It is to be appreciated that the foregoing natural language application is merely an illustrative example, and that numerous applications can be formulated as MCMC sampling performed in accordance with a target distribution and in the context of a search tree of decision sequences. For example, another application suitably formulated as MCMC sampling performed in accordance with a target distribution and in the context of a search tree of decision sequences is medical diagnosis. In this case, the decision nodes correspond to diagnostic test results, symptom information, or other probative information, and the terminal nodes correspond to medical diagnoses with associated statistical likelihoods.

It is recognized herein that in cases in which the sampling is performed in the context of a search tree of decision sequences, the MCMC sampling process can be made more efficient by placing bounds on non-terminal nodes of the search tree. Whenever the sampling is following a decision sequence and reaches a node for which the bound ensures that no sample can be found below that node that satisfies the target distribution (for a given drawn probability or other given statistical instance), a rejection can be issued, a repetition of the current sample can be added to the Markov chain, and processing can move to a new sample acquisition. This use of bounds eliminates the need to follow a decision sequence to the terminal node, thus substantially enhancing computational efficiency.

In a disclosed further improvement, such bounds can also be used to generate a statistical "promise" distribution of how promising (or likely) it is that a given non-terminal node of the search tree will be the source of a sample satisfying the target distribution. The statistical promise distribution is used to bias the sampling toward more promising nonterminal nodes. This biasing is compensated by generating or "synthesizing" and adding to the Markov chain the repetitions of the current sample that would (statistically) have occurred if the MCMC sampling had been performed without using the statistical promise distribution. This overcomes the problem in conventional MCMC of cycling through many rejection repetitions and consequent repetitions of the last accepted sample before moving on to a next sample satisfying the acceptance criterion. In brief, this problem is overcome by synthesizing these repetitions without incurring the computational cost of actually performing the corresponding sampling.

With reference to FIG. 1, an application employing MCMC sampling with bounding of nodes as disclosed herein is diagrammatically illustrated. The application includes an MCMC sampling algorithm 10 configured to perform MCMC sampling over a search tree with partial search tree expansion and using a bound on nodes to economize the sampling. The MCMC sampling algorithm 10 receives as inputs a target distribution 12 (which, in general, is not normalized), a domain to be sampled 14, a normalized proposal distribution 16 for use in the MCMC sampling, a search tree framework 18 for the domain 14, and a bound 20 on the nodes. The various inputs 12, 14, 16, 18, 20 are constructed or designed based on the specific application. By way of illustrative example, in a parsing application the domain 14 to be sampled is defined by natural language content to be parsed, the search tree framework 18 is suitably constructed as a decision tree implementing a probabilistic context-free grammar (PCFG) with additional transversal constraints for the domain 14, the proposal distribution 16 is suitably the PCFG without the transversal constraints, and the target distribution 12 is the distribution obtained by multiplying the weights generated by the PCFG by weights representing the transversal constraints. The bound 20 on nodes is, in this illustrative example, suitably embodied as an upper bound on this product of the PCFG weights and the transversal constraint weights.

The output of the MCMC sampling algorithm 10 is a Markov chain 22 of accepted samples. Preferably, the MCMC sampling algorithm 10 performs sampling for a sufficiently long time for the Markov chain 22 to reach an equilibrium state. Since the MCMC sampling algorithm 10 is designed to sample in accordance with the target distribution 12, the samples of (equilibrium) the Markov chain 22 comport with a normalized version of the target distribution 12 (or, said another way, comport with a normalized probability generated by normalizing the target distribution 12). An optional post-processor 24 computes a result of interest from the Markov chain 22. For example, the post-processor 24 may generate a functional approximation of the normalized probability represented by the accepted samples of the Markov chain 22. In the illustrative parsing application, the post-processor 24 suitably identifies the most probable parsing (or a set of N most probable parsings) for the natural language content (that is, the domain 14 in this application) based on the distribution of the samples of the Markov chain 22. In some embodiments the Markov chain 22 itself may be the result of interest, in which case the post-processor 24 is suitably omitted, or is provided only to compute supplemental information such as statistics of the samples of the Markov chain 22.

The MCMC sampling algorithm 10 and optional auxiliary post-processor 24 are suitably implemented by a digital processing device such as an illustrative computer 30, or another digital processing device such as a "smartphone", personal data assistant (PDA), network server computer, graphical processing unit (GPU, for example a game console modified to implement the processing components 10, 24), or so forth. In some embodiments, the useful result (e.g., the Markov chain 22 or a useful result computed from the Markov chain 22 by the post-processor 24) is displayed in a human-viewable format on a display device 32 included with or driven by the computer 30. The computer 30 or other digital processing device may also include or have access to suitable data storage, e.g., a hard drive or other magnetic medium, or an electronic storage medium such random access memory (RAM), flash memory, or so forth, or an optical disk or other optical memory, or so forth, for storing relevant data such as the Markov chain 22 and the inputs 12, 14, 16, 18, 20 or copies or representations thereof. The computer 30 or other digital processing device may also include or have access to one or more user interface devices, such as an illustrative keyboard 34, and/or a mouse, trackball, trackpad, or other pointing device, or so forth, via which a human user can control the application (for example, by inputting or identifying the inputs 12, 14, 16, 18, 20).

Moreover, it is to be appreciated that the processing components, such as the MCMC sampling algorithm 10 and optional post-processor 24, can be implemented as a non-transitory storage medium storing software, firmware, or other instructions executable by the illustrative computer 30 or another digital processing device to implement the disclosed sampling and related processing. The non-transitory storage medium may, by way of illustrative example, include one or more of: a hard drive or other magnetic medium, or an electronic storage medium such random access memory (RAM), flash memory, or so forth, or an optical disk or other optical memory, a redundant array of independent disks (RAID) providing storage for a network server or other network-connected digital processing device, or so forth.

Figure 2:
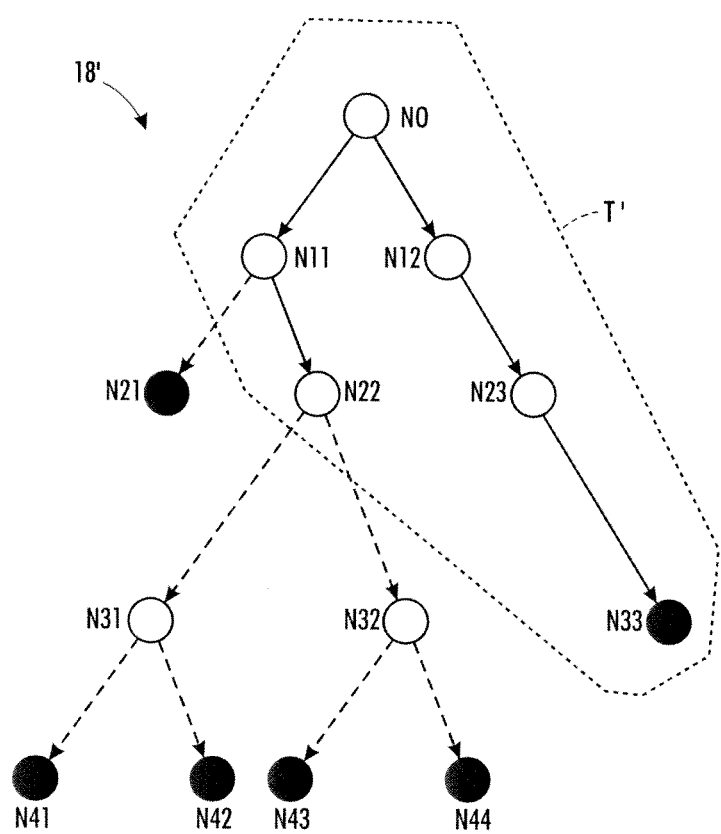
FIG. 2 diagrammatically shows a search tree and a partial search tree defined by the Monte Carlo sampling of the apparatus of FIG. 1.

With brief reference to FIG. 2, the search tree 18 is described. FIG. 2 shows an illustrative search tree 18' (where the prime denotes the specific illustrative example). In performing the sampling, the MCMC sampling algorithm 10 performs partial search tree expansion. At any given time in the sampling, the partial search tree is represented as T. FIG. 2 identifies the nodes belonging to a currently expanded partial search tree T' (where again the prime denotes a specific illustrative example). The partial search tree T includes leaves, which may or may not be terminal nodes of the full search tree 18. For example, the illustrative partial search tree T' shown in FIG. 2 includes a leaf node N22 that is not a terminal node of the full search tree 18' (because nodes N31, N32 branch directly off the node N22), and also includes a leaf node N33 which is also a terminal node of the full search tree 18'. The term "leaf" or "leaves" is used herein to denote nodes of the partial search tree T (where a leaf has no branches within the partial search tree T), while "the terminal node" or "terminal nodes" is used to denote terminal nodes of the full search tree 18 (a terminal node has no branches within the full search tree 18). In the illustrative example of FIG. 2, terminal nodes are shown as filled circles while nonterminal nodes are shown in open (unfilled) circles.

The search tree 18 is traversed in a "downward" direction, that is, given a starting node a decision is made at the starting node which selects a branch under the starting node. The selected branch is followed "downward" to the next node where a further decision is made to select a further branch, and so forth. In this terminology, the terminal nodes are at the "bottom" of the search tree 18, as seen in the illustrative search tree 18' of FIG. 2. The topmost (or uppermost) node of the search tree 18 (namely node N0 in the illustrative search tree 18' of FIG. 2) is referred to as the "root" node. While phraseology such as "downward" and "below" is used herein for explanatory convenience, it will be appreciated that more fundamentally the search tree is traversed in a "decision sequence" by moving from node to node in the direction away from the root node, following decision branches in accordance with the layout of the search tree 18, with the decision sequence ultimately terminating at one of the terminal nodes. In this context, consider a node $n_2$ that can be reached from a non-terminal node $n_1$ by traversing a decision sequence from $n_1$ to $n_2$. The node $n_2$ is thus "below" the node $n_1$. As further notation used herein, the node $n_2$ is said to be subsumed by the node $n_1$, and this subsuming relationship is denoted $n_1 \prec n_2$ (or, equivalently, $n_2 \succ n_1$).

The terminal nodes of the full search tree 18 represent elements of the domain 14. In some embodiments and for some applications, an element corresponds to a configuration generated by a decision sequence through the search tree 18. For example, in a parsing application the decision sequence through the search tree 18 constructs a (candidate or probabilistic) parsing of the natural language content (i.e., the domain 14 in the parsing example). Thus, in the parsing application, an element represents a configuration constructed by traversal of the decision sequence via which the terminal node is reached.

In other embodiments, the element may not incorporate information pertaining to the decision sequence via which the terminal node was reached (in other words, the element is not a configuration embodying the decision sequence, but rather is a datum or data set associated only with the terminal node). An example of such an embodiment is a medical diagnosis application in which the traversed decision sequence is not of significance, but only the (candidate or probabilistic) diagnosis associated with the terminal node (and its associated statistical probability which indicates the likelihood that the diagnosis is correct).

Having provided an overview of the MCMC sampling algorithm 10 and associated components with reference to FIG. 1, and a description of the search tree 18 and associated terminology with reference to FIG. 2, some illustrative embodiments of the MCMC sampling algorithm 10 are next set forth.

The illustrative embodiments of the MCMC sampling algorithm 10 employ independent Metropolis-Hastings (MH) sampling of elements of the domain 14 to be sampled to generate a set of samples forming the Markov chain 22. The independent MH sampling is performed over the search tree 18 of decision sequences representing the domain 14 to be sampled and having terminal nodes corresponding to elements of the domain. In the disclosed illustrative embodiments, the independent MH sampling is constrained using the bound 20 on nodes of the search tree.

For notational purposes, a terminal node of the search tree 18 is denoted as x, while a leaf node of the partial search tree T is denoted as y. The sampling generates the Markov chain of accepted samples as sample elements x (also sometimes referred to herein as samples x). In general, a leaf node y of the partial search tree T may or may not be a terminal node of the full search tree 18. The (unnormalized) target distribution 12 is denoted herein as $p(x)$. The proposal distribution 16 is denoted as $q(x'|x)$ (for generalized MH sampling in which the proposal distribution q is conditioned on the last sample 9 or as $q(x')$ (for independent MH sampling in which the proposal distribution q is independent of the last sample x).

The MH sampling is used to sample the domain 14 in accordance with the (unnormalized) target distribution 12. At equilibrium, the samples forming the output Markov chain 22 should conform with the normalized probability $\pi(x)=p(x)/\Sigma_z p(z)$ where z represents an arbitrary element of the domain 14. The unnormalized target distribution 12 is a known input to the MH sampling, while the normalized probability $\pi(x)=p(x)/\Sigma_z p(z)$ is unknown and is to be determined by the MH sampling. The proposal distribution q is a normalized distribution which is readily computed, and hence can be used to sample the domain 14. The (generalized) MH sampling starts with an initial sample x and performs the following loop:

---
Algorithm 1 MH

1: Initialize x to a configuration
2: while True do
3:    Sample an x' using q(.|x)
4:    Compute the ratio $r_x(x') \equiv \dfrac{p(x')/q(x'|x)}{p(x)/q(x|x')}$ and set $\bar{r}_x(x') \leftarrow \min(r_x(x'), 1)$
5:    Draw $\alpha \sim U[0, 1]$             // Uniform distribution
6:    if $\alpha < \bar{r}_x(x')$ then
7:       Print x'                // Accept x'
8:       x ← x'
9:    else
10:      Print x                 // Reject x'
---

In Algorithm 1 (and in other algorithms set forth herein) the term "Print x" or similar notation is intended to denote that the argument x is added to the Markov chain 22. Such "printing" can be done physically, e.g. by displaying x on the display device 32 or by printing x on a physical sheet of paper. More generally, however, such "printing" is to be understood as encompassing adding the argument x to the Markov chain 22 in a logical or data processing sense, for example by adding x to a list, set, array, or other data structure even in the absence of any physical display or printing. Also, in Algorithm 1 (and in other algorithms set forth herein) the loop structure denoted at line 2 of Algorithm 1 (that is, the notation "while True do") formally denotes a loop that is performed forever. As used herein, however, that notation is to be understood as encompassing various stopping criteria into the loop. For example, the "while True do" of Algorithm 1 may incorporate a stopping criterion that stops the looping once the Markov chain reaches an equilibrium condition as measured by a suitable metric.

Algorithm 1 computes a certain ratio $\bar{r}_x(x')$ (line 4) and then x' is accepted with probability $\bar{r}_x(x')$ and otherwise rejected. Formally, the acceptance with probability $\bar{r}_x(x')$ is implemented by a value $\alpha$ drawn from a uniform probability $U[0, 1]$. If the drawn probability value $\alpha$ is less than the ratio $\bar{r}_x(x')$ (line 6) then x' is accepted (i.e., printed, that is, added to the Markov chain 22). On the other hand, If the drawn probability value $\alpha$ is not less than the ratio $\bar{r}_x(x')$ (line 9) then x' is rejected and a repetition of the previously accepted sample x is added to the Markov chain 22. Under mild conditions on the normalized proposal distribution $q(x'|x)$ (for generalized MH sampling) the MH Algorithm 1 is guaranteed to produce the Markov chain 22 that, in the limit, converges to the normalized probability $\pi(x)=p(x)/\Sigma_z p(z)$.

Independent MH can be considered as a special case of the generalized MH Algorithm 1, in which the normalized proposal distribution q is not independent of the last accepted sample x. In this case, the normalized proposal distribution 16 can be written as $q(x')$ and the independent MH algorithm is as follows:

---
Algorithm 2 INDEPENDENT-MH

1: Initialize x to a configuration
2: while True do
3:    Sample an x' using q(.)
4:    Compute the ratio $r_x(x') \equiv \dfrac{p(x')/q(x')}{p(x)/q(x)}$ and set $\bar{r}_x(x') \leftarrow \min(r_x(x'), 1)$
5:    Draw $\alpha \sim U[0, 1]$
6:    if $\alpha < \bar{r}_x(x')$ then
7:       Print x'                // Accept x'
8:       x ← x'
9:    else
10:      Print x                 // Reject x'
---

The only changes as compared with Algorithm 1 are in lines 3 and 4 where the unconditioned $q(x')$ is used.

The Independent-MH algorithm is guaranteed to converge to the target distribution $\pi(x)=p(x)/\Sigma_z p(z)$ in the limit. However, it is known that the independent MH algorithm has a tendency to get trapped for long times in high values of the unnormalized target distribution $p(x)$ 12. When x is a high value for p, it may be difficult for the normalized proposal distribution $q(x')$ propose a sample x' which is "reasonable" from the point of view of p, that is, for which $r^x(x')$ is not so small that accepting x' becomes highly improbable, with a consequence that the last accepted sample x gets repeatedly added to the Markov chain 22 many times in a row (via lines 9 and 10 of Algorithm 2) before a new x' gets accepted. This tendency to stagnate at a high value of p is due to the fact that q—unless it can be designed to be very "close" to p, which is often not feasible—is "blind" relative to p. As a consequence, the proposed new sample x' that is proposed by q may easily land in areas for which the target distribution p is very low.

A similar "trapping" can also occur for the generalized MH Algorithm 1, but in that case the trapping is a consequence of the conditioning of the proposal distribution q(x'|x) on x. If the conditional probability q(x'|x) is such that the candidate x' tends to be chosen "close" to a local maximum x for p, then its probability p(x') may also be close to p(x), allowing x' to have a reasonable probability of acceptance. However, the next candidates, which in turn will be close to x', will have difficulty moving far away from the local "peak" at x, and the generalized MH sampling will tend to stay in the vicinity of x for a long time before "diffusing" to another peak.

The independent MH Algorithm 2 does not necessarily operate on a domain represented by a search tree. However, when the independent MH Algorithm 2 is applied to the domain 14 represented by the search tree 18, then the sampling can be seen as a set of decisions made while traversing the search tree 18 in the downward direction (i.e., away from the root node) until reaching a terminal node x' of the search tree 18. This terminal node x' is then accepted with a "probability" $\bar{r}_x(x')$ by the mechanism of drawing the value α from a uniform probability U[0,1] (Algorithm 1 line 5) and comparing the drawn value α with $\bar{r}_x(x')$ (lines 5-10).

As disclosed herein, however, the full traversal of the search tree to reach the terminal node x' can be avoided by using the bound 20 on the nodes. To provide further notation, the value of the bound 20 on a leaf node y of the partial search tree T is denoted β(y). The bound 20 is constructed such that every possible element x' that is below the node y (said another way, all x' for which y ≺ x') has the property that $r(x') \le \beta(y)$ where $r(x') \equiv p(x')/q(x')$. Because $r_x(x') = r(x')/r(x)$, and setting $\beta_x(y) = \beta(y)/r(x)$, this also implies that $\beta_x(y)$ is an upper bound for $r_x(x')$ for all x' that are below the node y (that is, for all x' for which y ≺ x'). To make use of such bounds, the independent MH Algorithm 2 is modified slightly as follows:

---

Algorithm 3 INDEPENDENT-MH-VARIANT

1: Initialize x to a configuration
2: while True do
3:    Draw α ~ U[0, 1]
4:    Sample an x' using q(.)
5:    Compute the ratio $r_x(x') \equiv \frac{p(x')/q(x')}{p(x)/q(x)}$ and set $\bar{r}_x(x') \leftarrow \min(r_x(x'), 1)$
6:    if α < $\bar{r}_x(x')$ then
7:      Print x'       // Accept x'
8:      x ← x'
9:    else
10:     Print x       // Reject x'

---

It is seen that Algorithm 3 differs from Algorithm 2 only in that the value α is drawn from the uniform probability U[0,1] (Algorithm 3 line 3) before the sample element x' is drawn from the domain 14. This does not change operation of the algorithm, because the draw of α is completely independent of the draw of x'.

However, the effect of the early draw of α in independent MH Algorithm 3 is that α is known during the sampling of x' in accordance with the proposal distribution q. Thus, α is known during traversal of the decision sequence to reach x'. During this decision sequence traversal, at each intermediate node y the value $\beta_x(y)$ at the node y can be computed and compared with α. If $\alpha \ge \beta_x(y)$ then it is immediately known that any x' below y (that is, any x' for which y ≺ x') cannot be accepted. It follows that a rejection can be immediately issued by transferring processing to line 9 of the independent MH Algorithm 3. In other words, the current sampling attempt is rejected immediately, without completing traversal of the decision sequence to a terminal node x'. For a large search tree, this can provide substantial processing cost saving.

Figure 3:
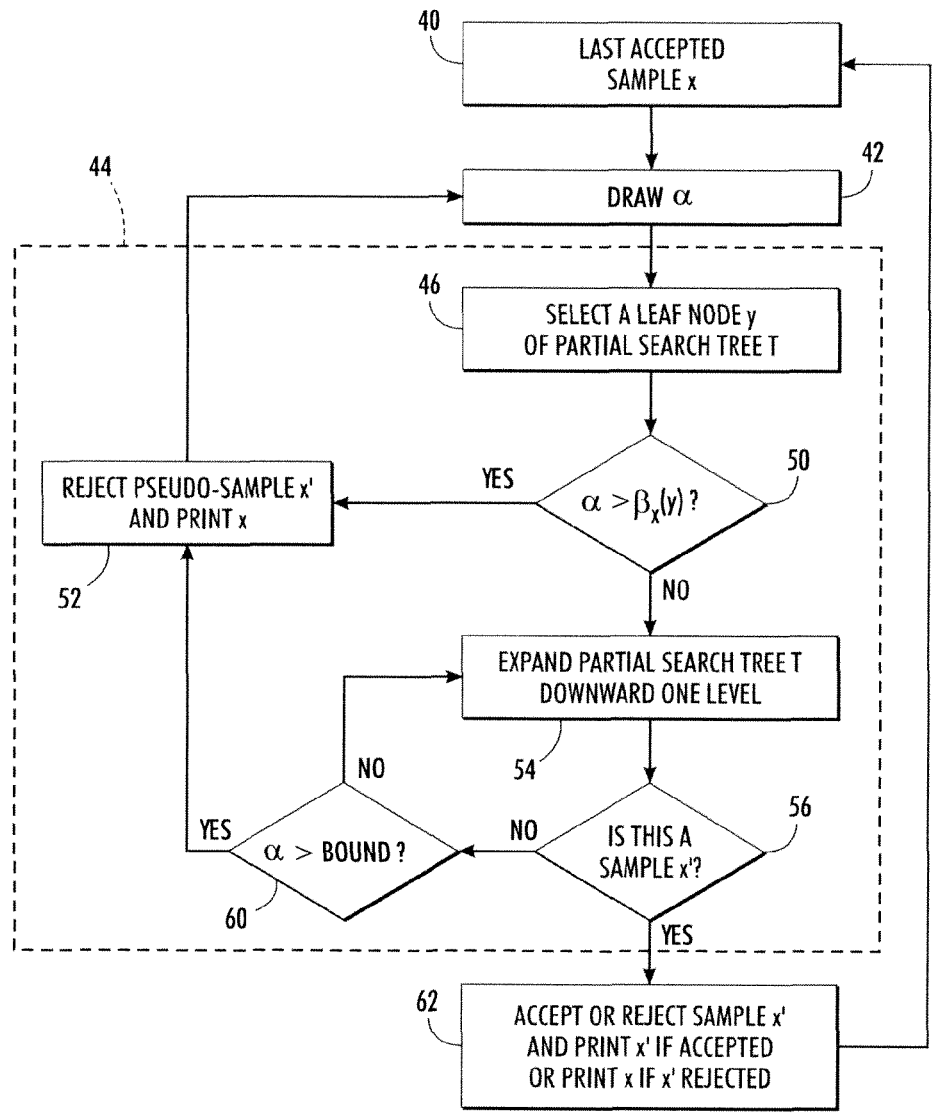
FIGS. 3 and 4 diagrammatically show processing suitably performed by the apparatus of FIG. 1.

With reference to FIG. 3, this usage of the bound 20 on nodes to constrain the independent MH sampling is diagrammatically illustrated. The sampling attempt shown in FIG. 3 starts with a last currently accepted sample x denoted by box 40. In an operation 42 corresponding to Algorithm 3 line 3, a value α is drawn from the uniform probability U[0,1].

A sub-process 44 then performs the draw of the sample x' in accordance with the proposal distribution q. The sub-process 44 corresponds to Algorithm 3 line 4, but is modified to constrain the sampling using the bound 20 on the traversed nodes. In the context of the search tree 18, the draw of the sample x' entails drawing a leaf node y from the partial search tree T (FIG. 3 operation 46), and following a decision sequence downward from the leaf node y (while expanding the partial tree T) until a terminal node x' is reached. In the modified decision sequence traversal of FIG. 3, before moving to a next-lower (i.e., branch) node the value of the bound 20 for the current node y is first checked to see if an early rejection is appropriate. Toward this end, at a decision operation 50 the value $\beta_x(y)$ of the bound 20 at the node y is compared against the (already drawn) value α. If the condition $\alpha \ge \beta_x(y)$ is satisfied, then it is known that, regardless of how the subsequent decision sequence traversal proceeds, the ultimately identified sample x' cannot be accepted. In other words, an acceptable element x' cannot be identified by continuing the decision sequence traversal. This is because the bound value $\beta_x(y)$ at the node y is an upper bound on the value of all terminal nodes x' below the node y. Thus, if the decision operation 50 finds that the condition $\alpha \ge \beta_x(y)$ is satisfied, then process flows to a rejection block 52 where the "pseudo-sample" x' is rejected. The phrase "pseudo-sample" x' is used here to emphasize that no terminal node x' was actually reached—rather, the decision operation 50 terminated the traversal of the decision sequence before reaching any terminal node. Nonetheless, whatever terminal node would have been reached (i.e., the pseudo-sample x') would have been rejected, and that rejection is implemented by the rejection block 52, which rejects the pseudo-sample x' and prints x (that is adds a repetition of the last-accepted sample x to the Markov chain 22. Processing then returns to operation 42 to perform a new sampling attempt.

On the other hand, if the condition $\alpha \ge \beta_x(y)$ is not satisfied, then process flows from the decision block 50 to a block 54 which expands the partial search tree x' to encompass the next-lower (i.e., branch) node selected by the decision performed at the node y. At a decision block 56 it is determined whether this next-lower node is a terminal node. If it is not a terminal node, then at a decision block 60 the condition $\alpha \ge \beta_x(y)$ is checked for this next-lower non-terminal node. If the condition $\alpha \ge \beta_x(y)$ is satisfied then an early rejection is appropriate, and the processing flows to block 52. If the condition $\alpha \ge \beta_x(y)$ is not satisfied then the process flows back to the block 54 to make traversal to the next-lower node in the decision sequence. As long as the condition $\alpha \ge \beta_x(y)$ is not met, the process loop 54, 56, 60 will continue to iterate until either the decision block 60 forces an early rejection due to the condition $\alpha \ge \beta_x(y)$ being satisfied, or the decision block 56 identifies a terminal node x'. In the latter case, the processing flows to an operation 62 which accepts or rejects x' and print either x' (if x' is accepted) or x (if x' is rejected).

In the context of Algorithm 3, the operations 50, 52 of FIG. 3 are suitably implemented by checking for the condition $\alpha \geq \beta_x(y)$ at each node during the decision sequence traversal performed in the context of line 4, and transferring control to line 9 if the condition $\alpha \geq \beta_x(y)$ is satisfied at any node. Further, the operation 62 corresponds to lines 5-10 of Algorithm 3.

The use of the bound 20 to constrain the independent MH sampling can be further conceptualized by comparison with the well-known A* optimization algorithm. See, e.g., Russell et al., Artificial Intelligence: A Modern Approach (Prentice-Hall, Englewood Cliffs, N.J., $2^{nd}$ edition, 2003). This algorithm models the optimization search space by a search tree of decision sequences whose leaves correspond to possible optimization solutions. A partial search tree is maintained, corresponding to incomplete decision sequences, and each leaf of the partial search tree is associated with an "optimistic bound on the values of the solutions that are subsumed by the leaf. Each iteration of the optimization expands the leaf of the partial search tree having the largest bound value, and the iterations stop when the expansion reaches a terminal node of the search tree.

The bound 20 is used in FIG. 3 in the context of Monte Carlo sampling, not optimization, and is used to enhance efficiency by early termination of the traversal of decision sequences during sampling attempts, rather than being used to guide an optimization path (i.e., pathfinding) as in the case of the A* optimization algorithm. In spite of these differences, various search tree formulations and bound constructions used in the A* optimization algorithm are expected to be readily adapted for use in the search tree-based MCMC sampling algorithms constrained using a bound on nodes, as disclosed herein.

Figure 4:
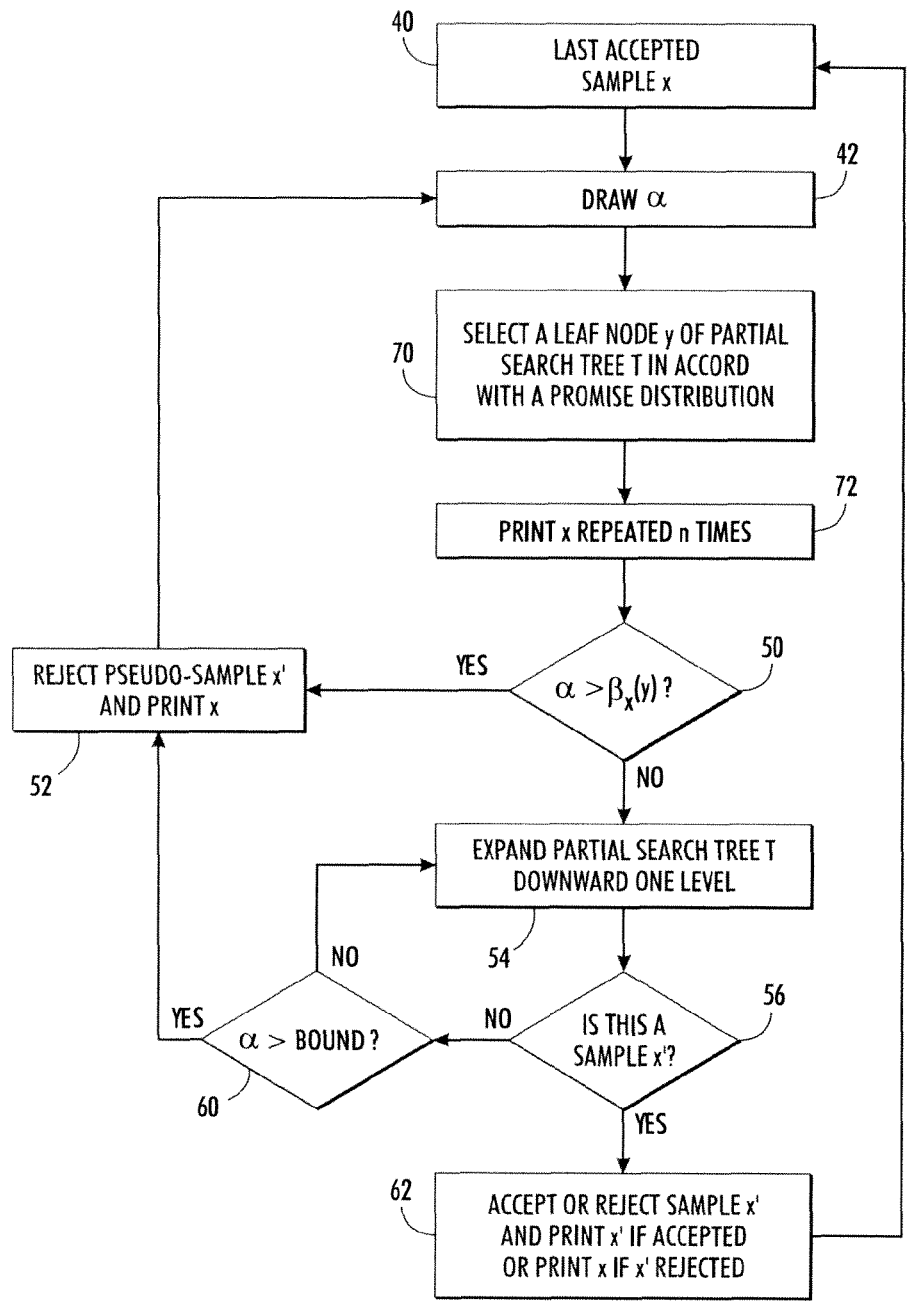

With continuing reference to FIG. 1 and with further reference to FIG. 4, the bound 20 can additionally or alternatively be used to generate a statistical "promise" distribution indicative of how promising (or likely) it is that a given non-terminal node y of the search tree will be the source of an accepted sample x'. The statistical promise distribution is used to bias the sampling toward more promising nonterminal nodes, with this biasing compensated by generating or "synthesizing" and adding to the Markov chain 22 the repetitions of the current sample that would (statistically) have occurred if the MCMC sampling had been performed without using the statistical promise distribution. Some illustrative approaches are next described.

By hypothesis, for each leaf y of the current partial search tree T, we know a bound value $\beta_x(y)$. Further denote by $Q(y) \equiv \Sigma_{x' \succ y} q(x')$ the probability that sampling some x' relative to q traverses the node y, and further assume that Q(y) is straightforward to compute incrementally in a bottom-up way (for example, the proposal function q may be naturally expressed in terms of the conditional probabilities $Q(y_{j+1}|y_j)$, where the prefix $y_{j+1}$ is a one-step expansion of the prefix $y_j$). By way of review, with these notations the approach of FIG. 3 can be succintly characterized as follows: in order to sample an x', a value $\alpha$ is first drawn from the uniform distribution U[0,1], and then a leaf y in the partial search tree T is drawn according to Q(y), and then the decision sequence is traversed to continue below the leaf y only when the condition $\alpha < \beta_x(y)$ holds.

This is now extended to a more predictive approach employing a statistical promise distribution. The term "promising attempt" denotes those cases in which a leaf y satisfies the condition $\alpha < \beta_x(y)$. Note that having such a situation does not mean that continuing following the decision sequence will result in identifying an x' that will actually be accepted with the current $\alpha$—it only means that it is possible that an acceptable x' will be identified for this $\alpha$.

The observation is now as follows: knowing x, and the bound value $\beta_x(y)$ for the leaves of the partial search tree T, the distribution of triples (y', n', $\alpha'$) can be directly computed. In this triple, y' is the first leaf in the partial search tree T for which a promising attempt is encountered, $\alpha'$ is the value of $\alpha$ that is observed when this promising attempt is encountered, and n' is the number of non-promising attempts that are encountered before getting to y'. This distribution can be computed as follows. Denote the leaves of the partial search tree T as $y_1, \ldots, y_m$, and defining $\gamma = \Sigma_i \bar{\beta}_x(y_m) Q(y_i)$ where $\bar{\beta}_x(y) = \min\{\beta_x(y), 1\}$. Further, define the geometric distribution $G[\gamma] = \gamma(1-\gamma)^{n-1}$. Then, the triples (y', n', $\alpha'$) can be generated by sampling according to the following "synthetic" procedure:

---
Procedure I - Synthetic sampling

1: Draw n' ~ G[γ]  // G: Geometric distribution
2: Draw $y_i$ ~ M[$\bar{\beta}_x(y_1)Q(y_1)/\gamma, \ldots, \bar{\beta}_x(y_m)Q(y_m)/\gamma$]  // M: Multinomial distribution
3: Draw $\alpha'$ ~ U[0, $\bar{\beta}_x(y_i)$]  // U: Uniform distribution
4: Set y' ← $y_i$ and return (y', n', $\alpha'$)
---

The value of $\gamma$ is always between 0 and 1, because $\Sigma_i Q(y_i)=1$ and $\bar{\beta}_x(y) \leq 1$. The mean of the geometric distribution $G[\gamma] = \gamma(1-\gamma)^{n-1}$ is $1/\gamma$, and therefore the nearer $\gamma$ is to zero, the larger n' is on average (Procedure I line 1). This means that a larger and larger amount of unpromising attempts are generated before getting to the first promising y'. As to this first y', it is selected proportionally to the ratio $\bar{\beta}_x(y')Q(y')$ (line 2). In particular, this means that if the ratio $\bar{\beta}_x(y')Q(y')$ is small, then few attempts will be made towards this y'. Indeed, in some applications such as a parser employing a probabilistic context-free grammar (PCFG) with unification constraints, it may even be that for a certain y' it may already be known that all the x' that are subsumed by y' are such that p(x')=0, and thus are subsumed by y', and thus that $\bar{\beta}_x(y')Q(y')=0$; in such cases, the procedure of line 2 will never even attempt to sample such an x'. Finally (Procedure I, line 3), $\alpha$ is sampled uniformly in the interval [0, $\bar{\beta}_x(y')$], for the y' obtained in the previous operation (that is, Procedure 1 line 2).

The synthetic Procedure I can be understood as follows. Consider one step of Algorithm 3, namely in which $\alpha$ is drawn from the uniform probability U[0,1] (Algorithm 3 line 3) and an x' is drawn in accordance with the proposal distribution q. The leaf y of the partial search tree T that this x' traverses is therefore selected with a probability Q(y), and the attempt with y is continued (that is, if not aborted) if and only if $\alpha < \bar{\beta}_x(y)$ holds, that is to say, with probability $\bar{\beta}_x(y)$. Thus, the probability that one step of Algorithm 3 does not immediately abort is $\Sigma_i \bar{\beta}_x(y_i)Q(y_i)=\gamma$. Assuming that it does not abort on this step, the probability that it selects $y_i$ is distributed according to the statistical promise distribution $M[\bar{\beta}_x(y_1)Q(y_1)/\gamma, \ldots, \bar{\beta}_x(y_m)Q(y_m)/\gamma]$. This statistical promise distribution indicates the likelihood that following a decision sequence rooted at the node $y_i$ will identify an acceptable element x'. Furthermore, when it selects $y_i$, the conditional distribution of $\alpha$ given that selection is uniform in the interval [0, $\bar{\beta}_x(y_i)$]. The probability that Algorithm 3 does not abort on the first step is $\gamma$. With probability $1-\gamma$ it does abort, and in this case, again with probability $\gamma$, it will not abort on its second step. Generally, the probability that it will succeed on the n-th step is therefore given by the geometric distribution of parameter $\gamma$, namely by $G[\gamma] = \gamma(1-\gamma)^{n-1}$. Given that it succeeds on step n, the conditional probability of selecting $y_i$ is given by the same multinomial distribution as on the first step, and the conditional distribution of α given this $y_i$ also by the same uniform distribution.

With reference to FIG. 4, an approach is diagrammatically illustrated which uses the bound 20 to generate statistical promise distribution M and to bias sampling based on M, and also uses the bound 20 to provide an early rejection if the bound lies below the drawn α. In common with the example of FIG. 3, the processing of FIG. 4 starts with the last currently accepted sample x denoted by box 40, and in the operation 42 a value α is drawn from the uniform probability U[0,1]. Thereafter, the example of FIG. 4 performs Procedure I in an operation 70 to select a leaf node y in accordance with the statistical promise distribution M and to pre-compute n aborted selection attempts. In an operation 72 the last accepted sample x 40 is printed n times (that is, n repetitions of the last accepted sample x are added to the Markov chain 22). These n "synthetic" rejections account for the n rejections that are statistically expected to occur before the leaf node y is accepted. (Again, acceptance of the leaf node y does not guarantee that any x' below y will actually be accepted and added to the Markov chain 22). Thereafter, processing continues with as already described with reference to FIG. 3, in order to check the bound value $\beta_x(y)$ of each successive node y against the drawn value α (operation 50), perform an early rejection if α≥$\beta_x(y)$ (operation 52), otherwise expand downward one node (operation 54) and perform the terminal node check (operation 56) and bound check (operation 60) and iterate until a terminal node x' is reached (or early rejection via operation 52). If a terminal node x' is reached then the operation 62 accepts or rejects the identified terminal node x' and updates the Markov chain 22 accordingly, and process flow returns to the block 40 to perform another sampling attempt.

In the following, another illustrative embodiment is set forth through the use of pseudo-code. As with the diagrammatic illustrative example of FIG. 4, this embodiment uses the bound 20 to generate statistical promise distribution M and to bias sampling based on M, and also uses the bound 20 to provide an early rejection if the bound lies below the drawn α. The following notation is used. Let Σ* be the set of finite sequences over a finite vocabulary Σ, and let X be a subset of Σ*, called the space of possible configurations. (In this example, the term "configuration" is used in place of "element", as discussed previously herein). Further provided is an unnormalized probability distribution, called the unnormalized target distribution, over X, namely that it is known how to compute for each x a non-negative weight p(x). The partition function $Z \equiv \Sigma_{x \in X} p(x)$ is strictly smaller than infinity. The normalized target distribution π is then defined as π(x)≡p(x)/Z. It is desired to perform Monte Carlo sampling from π using search tree-based independent MH sampling constrained using the bound 20 on nodes of the search tree 18. For use in the MH algorithm, a (normalized) proposal distribution q(x) is defined over X, from which it is known how to sample directly. It is further assumed that it is known by construction that the support of p is included in the support of q, which is itself included in X. Said another way, p(x)≠0 ⇒ q(x)≠0 ⇒ x ∈ X. It is also assumed that q is defined in an "incremental" way relative to the sequences in X; namely, for any sequence $y_k$ of length k in Σ*, and for any symbol s in Σ, the conditional probability $Q(y_{k+1}|y_k)$ can be computed, where $y_{k+1} = y_k + [s]$ is the sequence obtained by concatenating the decision s to the right of $y_k$, with $Q(y_{k+1}|y_k) \equiv Q(y_{k+1})/Q(y_k)$, where $Q(y) = \Sigma_{y \text{ is a prefix of } x} q(x)$. For a configuration x, r(x) denotes the ratio p(x)/q(x). If x' is a configuration, $r_x(x')$ denotes the ratio r(x')/r(x)=(p(x')/q(x'))/(p(x)/q(x)). If y is a node of the partial search tree T, β(y) denotes an upper bound of the value r(x') for the configurations x' such that y≻ x', where y≻ x' is read as "y subsumes x'", that is, y is a prefix of the configuration x'. If x is a configuration then $\beta_x(y)$ denotes β(y)/r(x). If a and b are two reals, then a∧ b denotes the minimum of a and b. The notation $\bar{a}$ is used to denote a∧ 1, and thus $\bar{\beta}_x(y) \equiv \beta_x(y) \wedge 1$. If y is a node of the partial search tree T, then P(y) is used herein to denote the "partition function" of p at y, i.e. $P(y) \equiv \Sigma_{y \prec x} p(x')$ and in the same notation $Q(y) \equiv \Sigma_{y \prec x} q(x')$.

With this notation defined, the illustrative sampling is set forth in the following four Algorithms.

The main Algorithm 4 is as follows:

---
Algorithm 4 FUNCTION MH*( )
---

Require: A proposal distribution q, an unnormalized target distribution p
Ensure: The sequence of outputs ($x_i$, $m_i$) is a chain which converges to π, if one considers that an output (x, m) actually encodes m repetitions of the output x. Note that printing these outputs is done inside the function JUMP-TO-ACCEPT.
1:  x ← ⊥, r(x) ← 0  // We initialize x to a special configuration ⊥, for which any jump to a configuration x' with r(x') > 0 will be accepted
2:  Initialize T to the root node Root, and associate with Root the upper bound β( Root ) = +∞
3:  while True do
4:     qj ← JUMP-TO-ACCEPT(x, T)
5:     if qj = 'GlobalFailure' then
6:        print 'No valid configuration exists'
7:        return 'GlobalFailure'
8:     else
9:        (x, T) ← qj   // JUMP-TO-ACCEPT has printed some (x, m); we update (x, T) and iterate

---

Algorithm 4 performs an infinite loop which outputs a sequence of pairs (x,m) where x is a configuration and in is a number of implicit repetitions of x. The actual Markov chain 22 is obtained by considering x to be output m times in the sequence. (Note that it is possible that two consecutive pairs to be (x,n) and (x,m), with the same configuration x).

Algorithm 5 is a "horizontal attempt" function, as follows:

---
Algorithm 5 FUNCTION HORIZONTAL-ATTEMPT(x, T)
---

Require: T is a partial search tree, x is a configuration and a leaf of T
Ensure: If all leaves $y_i$ of T have a null bound β($y_i$) = 0, then no configuration is feasible, and the function returns with a 'GlobalFailure'. Otherwise, the function returns with a triple ($y_i$, n, α), where $y_i$ is a leaf of T, n is a count corresponding to the implicit number of rejections before attempting the jump to $y_i$, and α is a number in [0, 1].
1: Collect all the leaves of T in a list [$y_1$, ..., $y_m$]
2: Compute $\gamma = \Sigma_i \bar{\beta}_x(y_i)Q(y_i)$
3: if γ = 0 then
4:     return 'GlobalFailure'
5: else
6:     Draw n ~ G[γ]    // Note that n can be equal to 0
7:     Draw $y_i$ ~ M[$\bar{\beta}_x(y_1)Q(y_1)/\gamma$, ..., $\bar{\beta}_x(y_m)Q(y_m)/\gamma$]
8:     Draw α ~ U[0, $\bar{\beta}_x(y_i)$]
9:     return ($y_i$, n, α)

---

Algorithm 5 does a "synthetic" attempt to jump to a leaf y of the partial search tree T in one step, and succeeds in this attempt, returning a triple (y, n, α), where y is a leaf of T, α is the current value for the corresponding variable, and n is the implicit number of aborted attempts before that first successful attempt. Algorithm 5 is seen to contain the substance of Procedure I which has already been described.

Algorithm 6 is a "vertical attempt" function, as follows:

---

Algorithm 6 FUNCTION VERTICAL-ATTEMPT(y, α, T)

---

Require: y is a leaf node of T, possibly a final configuration.
Ensure: The return value is (y', T', Flag), where T' is equal to T or is an
  extension of T under y, y' is a leaf node of T', and Flag is equal to
  'Accept' iff y' is (i) a configuration x' and (2) is accepted at level α
  relative to x. In addition each node z of T' is decorated with an upper
  bound β(z), and in case z is a configuration, this upper bound is
  actually equal to p(z)/q(z).
1: if y is a configuration then
2:   Compute r(y) = p(y)/q(y) (or retrieve it if β(y), which is equal to
     r(y) for configuration nodes, is already stored on node y)
3:   Compute $r_x(y) = r(y)/r(x)$
4:   β(y) ← r(y), store β(y) on T
5:   if $r_x(y) \geq \alpha$ then
6:     return (y, T, 'Accept')
7:   else
8:     return (y, T, 'Reject')
9: else
10:  Expand T into T', one level down from y
11:  For each node z below y, compute β(z) and store it on the node z of
     T'
12:  Randomly choose z below y according to Q(z|y)
13:  if $\beta_x(z) = \beta(z)/r(x) < \alpha$ then
14:    return (z, T', 'Reject')
15:  else
16:    return VERTICAL-ATTEMPT(z, α, T')    // We recurse below z

---

Algorithm 6 tries to "transform" the attempt at y into an actual accept of a configuration x' below y, but may fail, in which case the number of failed attempts to "escape" from x will be incremented by 1. During this vertical traversal of the subtree rooted at y, some nodes are added to the partial search tree T, along with their heuristic bounds. Algorithm 6 performs functionality analogous to that already described herein with reference to FIG. 3.

Algorithm 7 is a "jump to accept" function, as follows:

---

Algorithm 7 FUNCTION JUMP-TO-ACCEPT(x, T)

---

Require: T is a partial search tree, x is a configuration and is a leaf of T
Ensure: The return value is either of the form 'GlobalFailure', which
  means that we have detected that no possible configuration exists, or
  of the form (x',T') with T' an update of T and x' a leaf of T' which is a
  configuration that has just been accepted. We print (x, n'), with n'
  corresponding to the time we have spent at x altogether.
1: n' ← 1    // We have already sampled x once
2: while True do
3:   sa ← HORIZONTAL-ATTEMPT(x, T)
4:   if sa = 'GlobalFailure' then
5:     return 'GlobalFailure'
6:   else
7:     (y, n, α) ← sa    // We are getting to y after n implicit aborted
       attempts
8:     n' ← n' + n    // We have implicitly stayed on x during n more
       attempts
9:     (y',T', Flag) ← VERTICAL-ATTEMPT (y, α, T)
10:    if Flag = 'Accept' then
11:      print (x, n')    // n' is the number of times we have stayed on x
12:      x' ← y'
13:      return (x',T')
14:    else
15:      n' ← n' + 1    // The vertical attempt has failed, we stay on x
         one more time

---

Algorithm 7 repeats horizontal attempts followed by vertical attempts until some configuration is accepted. If not all configurations reachable by q are invalid then Algorithm 7 will eventually find a valid configuration, however in possibly unbounded time. In case that all configurations are invalid, the attempts to escape from the special configuration x=⊥, which is used to initialize the top procedure, will all fail. In some cases (for instance when the possible configurations correspond to decision sequences of bounded depth), the expansions of the partial search tree T will eventually end on a tree T the leaves of which all have heuristic bounds equal to 0, in which case the algorithm will be able to detect a global failure. Otherwise the algorithm may continue forever, without producing a valid configuration and also without being able to decide that there is none (this is consistent with the undecidability of the halting problem for Turing machines, which can be simulated with decision sequences over the proof trees of Prolog programs, for instance.)

The disclosed constrained MCMC sampling algorithms find application in diverse areas entailing sampling over a complex probability landscape. One illustrative example is when considering parsing using a probabilistic context-free grammar (PCFG) to which certain "transversal" constraints have been added, for instance a constraint requiring number agreement between a subject and a verb, whether this constraint requires a necessary agreement (weight is 0 if agreement is not respected), or only specifies that the agreement is strongly preferred (weight is small, but not null, if agreement is not respected). In such a situation, a natural proposal distribution q is that provided by the base PCFG without transversal constraints, and the full target distribution p corresponds to multiplying the base distribution by the weights of the transversal constraints; in this case the quotient r(x)=p(x)/q(x) is the product of transversal weights associated with a derivation. The bound 20 is implemented as an upper bound on this product, for example upper bounded on partial top-down derivations, which is often feasible.

Another application is to Statistical Machine Translation (SMT) in the Hierarchical framework. See, e.g. Chiang, "Hierarchical phrase-based translation", *Computational Linguistics*, 33:201-228, 2007 (available at http://www.mitpress-journals.org/doi/pdf/10.1162/coli.2007.33.2.201, last accessed Mar. 22, 2011). In this translation approach, for each source language sentence a PCFG is constructed that generates many possible derivations over this source language sentence, each individual derivation being associated with a different translation. A difficult problem in this case is to integrate an n-gram language model over the target string associated with each derivation. In the context of the disclosed tree-based Monte Carlo sampling with bounded nodes, this language model can be seen as a multiplicative factor over the base probabilities given by the source PCFG to its different derivations. This approach can be extended not only to such target language models, but also to any non-local feature that can contribute in weighting the derivations.

The disclosed MCMC sampling approaches are also applicable to many continuous distribution setups. To give an example, consider a target distribution p(x) over a perhaps large but finite interval A of the real line, for which the value of p(x) can be bounded over any given subinterval of A (perhaps by knowing a priori the possible local maxima for p). Take the normalized proposal distribution q to be the uniform distribution over A. (In the case where p is over the whole line, a non-uniform q should be used, for example a flat Gaussian, for which p(x)/q(x) can be bounded). Values for x can be sampled (up to a certain precision) according to binary sequences that dichotomize the interval A, and then the disclosed sampling algorithm can be applied to these sequences. The sampling algorithm will then tend to focus its effort to regions where p(x) has high values, and to gradually refine those regions to small granularity, while producing only a coarse refinement for regions where p(x) is small. Furthermore, it may be possible, through a suitable analysis of rejection rates, to cut up a priori the interval A into regions that maintain a good balance between low average rejection rate and size.

In the foregoing, it has been assumed the proposal distribution q is fixed during the entire sampling process, that is to say, to be not adaptive. However, this constraint can be relaxed, and q can be adapted during the sampling. A "static" adaptation approach is to do the adaptation a priori before starting the sampling process, for instance by defining q based on any available knowledge of the target distribution p so that the ratios p(x)/q(x) are close to a constant in the region undergoing sampling.

A second, "dynamic" adaptation approach is to adapt q during the sampling process itself, for instance by first estimating the partition function P(y) based on the fact that it is equal to the expectation under q(x'|y) of the quantity r(x')=p(x')/q(x'), and can therefore be estimated (but not always accurately) as a by-product of the sampling, and then by modifying q in such a way that Q(y)/P(y) becomes close to a constant—noting that the optimum case would be the one where the two quantities were always exactly proportional, for it would then mean that the proposal distribution would be equal to the invariant distribution π.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
 performing independent Metropolis-Hastings (MH) sampling of elements of a domain to be sampled to generate a set of samples, wherein the independent MH sampling is performed over a search tree of decision sequences representing the domain to be sampled, the search tree of decision sequences including non-terminal decision nodes and terminal nodes corresponding to elements of the domain, the independent MH sampling comprising following decision sequences of the search tree by traversing the search tree from node to node in a direction away from a root node following decision branches in accordance with the layout of the search tree with the decision sequence terminating at a terminal node identifying an element to be considered for acceptance or rejection; and
 constraining the independent MH sampling using a bound on nodes of the search tree wherein the value of the bound at a non-terminal decision node is a bound on the values of all terminal nodes reachable by traversing the search tree from the non-terminal decision node;
 wherein the performing and the constraining are performed by a digital processing device.

2. The method as set forth in claim 1, wherein the constraining comprises:
 terminating the following of a decision sequence upon reaching a non-terminal decision node whose bound value ensures that an acceptable element cannot be identified by continuing the following.

3. The method as set forth in claim 2, wherein the constraining further comprises:
 in combination with the terminating, adding to the set of samples a repetition of a previously accepted sample.

4. The method as set forth in claim 1, wherein the independent MH sampling comprises selecting nodes of the search tree to serve as starting nodes for following decision sequences of the search tree to identify elements to be considered for acceptance or rejection, and the constraining comprises:
 selecting a node to serve as a starting node in accordance with a statistical promise distribution indicating likelihood that following a decision sequence rooted at the node will identify an acceptable element.

5. The method as set forth in claim 4, wherein the constraining further comprises:
 after selecting a starting node, adding to the set of samples n repetitions of a previously accepted sample where n is based on the value of the statistical promise distribution at the selected starting node.

6. The method as set forth in claim 1, wherein the domain comprises probabilistic parsings of natural language content and the search tree defines a parser comprising a probabilistic context-free grammar (PCFG).

7. The method as set forth in claim 6, wherein the search tree defines said parser comprising said PCFG multiplied by transversal constraint weights, the independent MH sampling uses the PCFG as a proposal distribution, and the bound on nodes of the search tree is based on the transversal constraint weights.

8. The method as set forth in claim 1, wherein the domain comprises probabilistic target language translations of natural language content in a source language and the search tree defines a translation engine comprising a statistical machine translation (SMT) multiplied by a target language n-gram language model.

9. The method as set forth in claim 8, wherein the independent MH sampling uses the SMT as a proposal distribution and the bound on nodes of the search tree is based on the n-gram language model.

10. A non-transitory storage medium storing instructions executable by a processing device to perform a method as set forth in claim 1.

11. An apparatus comprising:
 a computer programmed to perform a method comprising:
  performing Markov Chain Monte Carlo (MCMC) sampling of elements of a domain to be sampled to generate a set of samples, wherein the MCMC sampling is performed over a search tree of decision sequences representing the domain to be sampled, the search tree including non-terminal decision nodes and terminal nodes corresponding to elements of the domain, the search tree being traversed in a decision sequence by moving from node to node in a downward direction following decision branches in accordance with the layout of the search tree with the downward traversal terminating at one of the terminal nodes; and
  constraining the MCMC sampling using a bound on nodes of the search tree wherein the value of the bound at a non-terminal decision node is a bound on the values of all terminal nodes below the non-terminal decision node in the search tree.

12. The apparatus as set forth in claim 11, wherein the MCMC sampling comprises independent Metropolis-Hastings (MH) sampling.

13. The apparatus as set forth in claim 11, wherein the constraining comprises:
 terminating the downward traversal of a decision sequence before reaching a terminal node, the terminating being at a non-terminal decision node whose bound value ensures that an acceptable element cannot be identified by continuing the traversal, and adding a repetition of a previously accepted sample to the set of samples.

14. The apparatus as set forth in claim 11, wherein the MCMC sampling comprises selecting nodes of the search tree to serve as starting nodes for traversing the search tree to identify elements to be considered for acceptance or rejection, and the constraining comprises:

selecting a node to serve as a starting node in accordance with a statistical promise distribution indicating likelihood that following a decision sequence rooted at the node will identify an acceptable element.

15. The apparatus as set forth in claim 11, wherein the MCMC sampling comprises selecting nodes of the search tree to serve as starting nodes for traversing the search tree to identify elements to be considered for acceptance or rejection, and the constraining comprises:

(i) selecting a node to serve as a starting node in accordance with a statistical promise distribution indicating likelihood that following a decision sequence rooted at the node will identify an acceptable element and (ii) adding n repetitions of a previously accepted sample to the set of samples where n is based on the value of the statistical promise distribution at the selected starting node.

16. The apparatus as set forth in claim 11, wherein the domain comprises probabilistic parsings of natural language content and the method comprises a natural language parsing method.

17. The apparatus as set forth in claim 11, wherein the domain comprises probabilistic target language translations of natural language content in a source language and the method comprises a natural language translation method.

18. A non-transitory storage medium storing instructions executable by a digital processing device to perform a method comprising:

performing Markov Chain Monte Carlo (MCMC) sampling of elements of a domain to be sampled to generate a set of samples, wherein the MCMC sampling is performed over a search tree of decision sequences representing the domain, the search tree including non-terminal decision nodes and terminal nodes corresponding to elements of the domain, the search tree being traversed in a decision sequence by moving from node to node in a downward direction following decision branches in accordance with the layout of the search tree with the downward traversal terminating at one of the terminal nodes, wherein the MCMC sampling accepts or rejects elements based on a probabilistic acceptance criterion and a drawn probability, and wherein the MCMC sampling constrains the sampling based on values of a bound at non-terminal decision nodes of the search tree wherein the value of the bound at a non-terminal decision node is a bound on the values of all terminal nodes below the non-terminal decision node in the search tree.

19. The non-transitory storage medium of claim 18, wherein the acceptance criterion comprises an unnormalized target probability to which the MCMC sampling conforms.

20. The non-transitory storage medium of claim 18, wherein the performing comprises:

performing independent Metropolis-Hastings (MH) sampling over the search tree to generate the set of samples.

21. The non-transitory storage medium of claim 18, wherein the performing comprises:

selecting a node of the search tree; and traversing the search tree in the downward direction starting at the selected node until one of the following conditions is met:

(1) a terminal node is reached and (2) the value of the bound at a traversed non-terminal decision node does not satisfy the acceptance criterion whereby the values of all terminal nodes below the non-terminal decision node in the search tree also do not satisfy the acceptance criterion.

22. The non-transitory storage medium of claim 18, wherein the performing MCMC sampling of elements of a domain comprises:

selecting a node of the search tree in accordance with a statistical promise distribution; and adding n repetitions of a previously accepted sample to the set of samples where n is based on the value of the statistical promise distribution at the selected node.

* * * * *